United States Patent
Lee et al.

(10) Patent No.: US 9,552,662 B2
(45) Date of Patent: Jan. 24, 2017

(54) METHOD AND APPARATUS FOR REMOVING FALSE INTERSECTION IN RAY TRACING

(71) Applicant: Samsung Electronics Co., Ltd., Suwon-si (KR)

(72) Inventors: Jaedon Lee, Yongin-si (KR); Youngsam Shin, Hwaseong-si (KR); Wonjong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/644,548

(22) Filed: Mar. 11, 2015

(65) Prior Publication Data
US 2015/0262408 A1    Sep. 17, 2015

(30) Foreign Application Priority Data
Mar. 14, 2014  (KR) .......................... 10-2014-0030459

(51) Int. Cl.
*G06T 15/06*    (2011.01)

(52) U.S. Cl.
CPC .................................... *G06T 15/06* (2013.01)

(58) Field of Classification Search
None
See application file for complete search history.

(56) References Cited

U.S. PATENT DOCUMENTS

| 7,164,420 | B2 | 1/2007 | Ard |
| 8,063,902 | B2 | 11/2011 | Salsbury et al. |
| 8,411,088 | B2 | 4/2013 | Sevastianov et al. |
| 8,441,482 | B2 | 5/2013 | Özdaç et al. |
| 2010/0328310 | A1 | 12/2010 | Peterson et al. |

FOREIGN PATENT DOCUMENTS

WO    WO 2008/037599 A1    4/2008

*Primary Examiner* — Edward Martello
(74) *Attorney, Agent, or Firm* — NSIP Law

(57) ABSTRACT

A method of removing an intersection test error in ray tracing includes obtaining an intersection by performing an intersection test on a ray and a primitive; determining location information of the intersection indicating whether the intersection is located inside or outside an object; determining an intersection error based on comparing the location information of the intersection to path information of the ray.

21 Claims, 5 Drawing Sheets

METHOD AND APPARATUS FOR REMOVING FALSE INTERSECTION IN RAY TRACING

CROSS-REFERENCE TO RELATED APPLICATIONS

This application claims the benefit of Korean Patent Application No. 10-2014-0030459 filed on Mar. 14, 2014, in the Korean Intellectual Property Office, the entire disclosure of which is incorporated herein by reference for all purposes.

BACKGROUND

1. Field

This application relates to methods and apparatuses for removing a false intersection in ray tracing.

2. Description of Related Art

A ray tracing method, also referred to as a ray tracking method, is a method in which a path of light incident along a ray proceeding toward each pixel of an image from a viewpoint of a camera is traced, thereby generating an image. Since physical characteristics of light, such as reflection, refraction, and transmission, may be reflected in a rendering result by using the ray tracing method, high quality images may be generated. Accordingly, the ray tracing method is widely used in a three-dimensional (3D) rendering field such as a movie or an animation in which realistic scenes are rendered.

With regard to the ray tracing method, an image is rendered by repeating a process of finding an intersection at which an object intersects with a ray and tracing a ray that is reflected or refracted from the intersection to find the intersection. However, since a floating point method that is used to express a real number in a computer system may have a slight difference from an actual value, an error may occur in a process of finding an intersection and generating secondary rays from the intersection. As such, if an error occurs at the intersection, it may be determined that a ray collides with a false object, and thus a hole may be generated in an image as a result of rendering.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of removing an intersection test error in ray tracing includes obtaining an intersection by performing an intersection test on a ray and a primitive; determining location information of the intersection indicating whether the intersection is located inside or outside an object; and determining an intersection error based on comparing the location information of the intersection to path information of the ray.

The determining of the intersection error may include determining that an intersection error has occurred in response to the location information indicating that the intersection is located at an inner surface of the object and the path information of the ray being OUT_RAY, or in response to the location information indicating that the intersection is located at an outer surface of the object and the path information of the ray being IN_RAY; wherein IN_RAY may be path information of a ray passing through the inside of the object, and OUT_RAY may be path information of a ray passing through the outside of the object.

The determining of the location information may include obtaining an inner product value of the ray and a normal vector of the primitive; determining that the intersection is located outside the object in response to the inner product value being a negative value; and determining that the intersection is located inside the object in response to the inner product value being a positive value.

The method may further include setting the path information of the ray to be OUT_RAY in response to the ray being a primary ray; wherein IN_RAY may be path information of a ray passing through an inside of the object, and OUT_RAY may be path information of a ray passing through an outside of the object.

The method may further include setting the path information of the ray to be opposite to path information of an incident ray in response to the ray being a refracted ray; wherein IN_RAY may be path information of a ray passing through an inside of the object, and OUT_RAY may be path information of a ray passing through an outside of the object.

The method may further include setting the path information of the ray to be equal to path information of an incident in response to the ray being a reflected ray; wherein IN_RAY may be path information of a ray passing through an inside of the object, and OUT_RAY may be path information of a ray that passing through an outside of the object.

The determining of the intersection error may include comparing identification information to which a starting point of the ray belongs to identification information of a primitive to which the intersection belongs; and determining an intersection error in response to the identification information to which the starting point of the ray belongs and the identification information of the primitive to which the intersection belongs being equal to each other.

The determining of the intersection error may include obtaining a distance between a starting point of the ray and the intersection; comparing the distance to a value $\epsilon$; and determining an intersection error in response to the distance being less than the value $\epsilon$.

In another general aspect, an apparatus for removing an intersection test error in ray tracing includes a processor configured to obtain an intersection by performing an intersection test on a ray and a primitive, and obtain location information of the intersection indicating whether the intersection is located inside or outside an object; and a memory configured to store path information of the ray; wherein the processor is further configured to determine an intersection error based on comparing the location information of the intersection to the path information of the ray.

The processor may be further configured to determine that an intersection error has occurred in response to the location information indicating that the intersection is located at an inner surface of the object and the path information of the ray being OUT_RAY, or in response to the location information indicating that the intersection is located at an outer surface of the object and the path information of the ray being IN_RAY; wherein IN_RAY may be path information of a ray passing through an inside of the object, and OUT_RAY may be path information of a ray passing through an outside of the object.

The processor may be further configured to obtain an inner product value of the ray and a normal vector of the primitive, determine that the intersection is located outside the object in response to the inner product value being a negative value, and determine that the intersection is located inside the object in response to the inner product value being a positive value.

The processor may be further configured to set the path information of the ray to be OUT_RAY in response to the ray being a primary ray; wherein IN_RAY may be path information of a ray that passing an inside of the object, and OUT_RAY may be path information of a ray passing through an outside of the object.

The processor may be further configured to set the path information of the ray to be opposite to path information of an incident in response to the ray being a refracted ray; wherein IN_RAY may be path information of a ray passing through an inside of the object, and OUT_RAY may be path information of a ray passing through an outside of the object.

The processor may be further configured to set the path information of the ray to be equal to path information of an incident in response to the ray being a reflected ray; wherein IN_RAY may be path information of a ray passing through an inside of the object, and OUT_RAY may be path information of a ray passing through an outside of the object.

The processor may be further configured to compare identification information of a primitive to which a starting point of the ray belongs to identification information of a primitive to which the intersection belongs, and determine an intersection error in response to the identification information to which the starting point of the ray belongs and the identification information of the primitive to which the intersection belongs being equal to each other.

The processor may be further configured to obtain a distance between the starting point of the ray and the intersection, compare the distance to a value $\epsilon$, determine an intersection error in response to the distance being less than the value $\epsilon$.

In another general aspect, an apparatus for removing an intersection test error in ray tracing includes an intersection obtainer configured to obtain an intersection by performing an intersection test on a ray and a primitive; an intersection location information generator configured to determine whether the intersection is located inside or outside an object; and a false intersection determiner configured to determine an intersection error by comparing location information of the intersection to path information of the ray.

The false intersection determiner may be further configured to determine that an intersection error has occurred in response to the location information indicating that the intersection is located inside the object and the path information of the ray being OUT_RAY, or in response to the location information indicating that the intersection is located outside the object and the path information of the ray being IN_RAY; wherein IN_RAY may be path information of a ray passing through an inside of the object, and OUT_RAY may be path information of a ray passing through an outside of the object.

The intersection location information generator may be further configured to obtain an inner product value of the ray and a normal vector of the primitive intersecting the ray; determine that the intersection is located outside the object in response to the inner product value being a negative value; and determine that intersection is located inside the object in response to the inner product value being a positive value.

The apparatus may further include a ray path information generator configured to set the path information of the ray to be OUT_RAY in response to the ray being a primary ray, set the path information of the ray to be OUT_RAY in response to the ray being a primary ray, and set the path information of the ray to be opposite to path information of an incident ray in response to the ray being a refracted ray; wherein IN_RAY may be path information of a ray passing through an inside of the object, and OUT_RAY may be path information of a ray passing through an outside of the object.

The apparatus may further include an identification information comparer configured to compare identification information of a primitive to which a starting point of the ray belongs to identification information of a primitive to which the intersection belongs; an intersection distance comparer configured to obtain a distance between the starting point of the ray and the intersection, and compare the distance to a value $\epsilon$ in response to the identification information to which the starting point of the ray belongs and the identification information of the primitive to which the intersection belongs being different from each other; and a false intersection determiner configured to determine an intersection error in response to the distance being less than the value $\epsilon$; wherein the false intersection determination unit may be further configured to compare the location information of the intersection to the path information of ray, and determine the intersection to be a false intersection in response to the location information of the intersection not being equal to the path information of the ray.

The false intersection determiner may be further configured to determine the intersection to be a false intersection in response to the identification information of the primitive to which the starting point of the ray belongs and the identification information of the primitive to which the intersection belongs being equal to each other.

In another general aspect, a non-transitory computer-readable storage medium stores a computer program for controlling a computer to perform a method of removing an intersection test error in ray tracing, the method including obtaining an intersection by performing an intersection test on a ray and a primitive; determining whether the intersection is located inside or outside an object; and determining an intersection error based on comparing location information of the intersection to path information of the ray.

The determining of whether the intersection is located inside or outside the object may include obtaining an inner product value of the ray and a normal vector of a primitive intersecting the ray; determining that the intersection is located outside the object in response to the inner product value being a negative value; and determining that the intersection is located inside the object in response to the inner product value being a positive value.

Other features and aspects will be apparent from the following detailed description, the drawings, and the claims.

DETAILED DESCRIPTION

Figure 1:
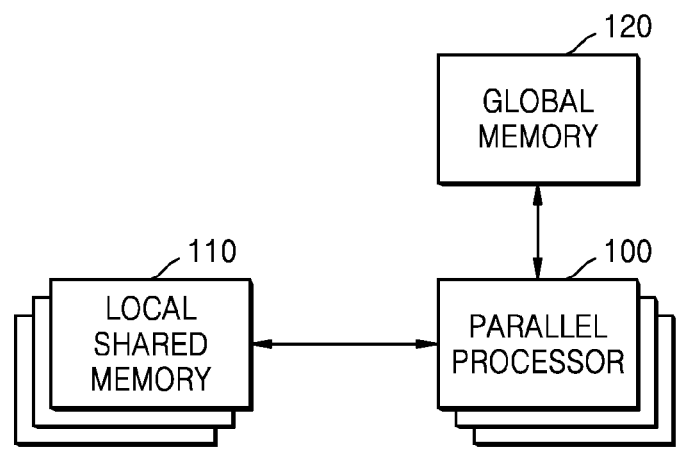
FIG. 1 illustrates an example of a system for executing a method of removing an intersection test error in ray tracing.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 1 illustrates an example of a system for executing a method of removing an intersection test error in ray tracing.

Referring to FIG. 1, parallel processors 100 include a plurality of parallel processors that process a large number of threads. The parallel processors 100 perform parallel processing to efficiently process a large amount of graphic data. The system includes a local shared memory 110. The local shared memory 110 includes a plurality of memories. Each of the plurality of memories is allocated to a respective one of the parallel processors 100 so that each of the parallel processors 100 may read data from a respective memory allocated thereto, and store processed data. The system includes a global memory 120. The global memory 120 is used by the parallel processors 100, and may be implemented on an integrated circuit. The system may further include a driver (not illustrated) for controlling the parallel processors 100.

Figure 2A:
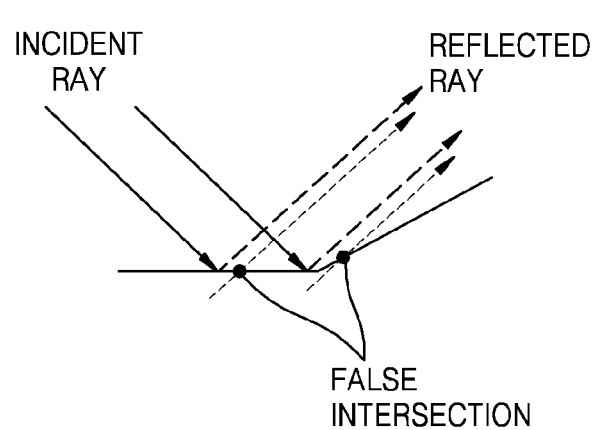
FIGS. 2A and 2B illustrate examples of a state in which an intersection error occurs due to a floating point error.
Figure 2B:
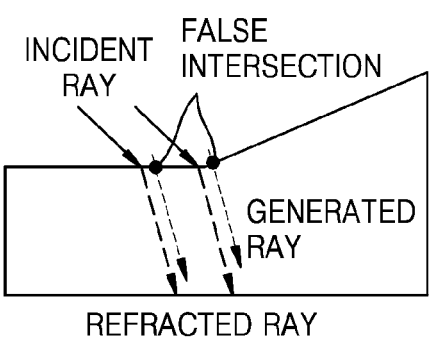

FIGS. 2A and 2B illustrate examples of a state in which an intersection error occurs due to a floating point error. If a starting point of a ray is incorrectly calculated due to a floating point error, it may be incorrectly determined that the ray intersects with a primitive to which the intersection belongs. If an intersection is located at an edge of a primitive, it may be incorrectly determined that a ray intersects with a primitive that is adjacent to the primitive to which the intersection belongs.

In this example, a generated ray is a ray that is generated using an intersection obtained by calculating an intersection at which an incident ray intersects with a primitive as a starting point.

Figure 3:
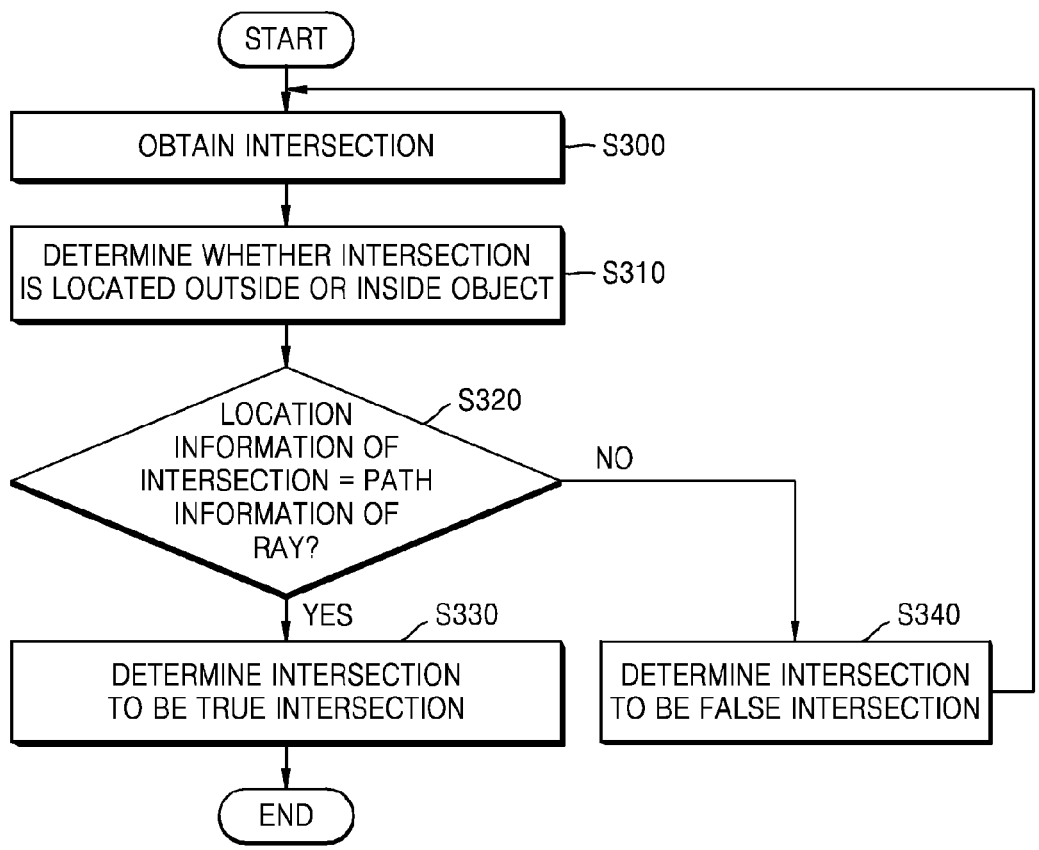
FIG. 3 illustrates an example of a method of removing an intersection test error in ray tracing.

FIG. 3 illustrates an example of a method of removing an intersection test error in ray tracing. Referring to FIG. 3, in operation S300, an intersection is obtained by performing an intersection test on a ray and a primitive. Then, in operation S310, location information of the intersection is generated by determining whether the intersection is located inside or outside an object (a set of a plurality of primitives). Whether the intersection is located inside or outside an object in operation S310 may be determined as follows. An inner product value of the ray and a normal vector of the primitive is obtained. If the inner product value is a negative value, it is determined that the intersection is generated outside the object. If the inner product value is a positive value, it is determined that the intersection is generated inside the object.

Location information of the intersection is compared to path information of the ray in operation S320. If the location information of the intersection is not equal to the path information of the ray, the intersection is determined to be a false intersection, and a next intersection is obtained in operation S340. For example, a tree search routine is executed, and an intersection with another primitive is obtained. Then, if the location information of the intersection is equal to the path information of the ray, the intersection is determined to be a true intersection, and a value of the intersection is returned to the tree search routine in operation S330.

Figure 4:
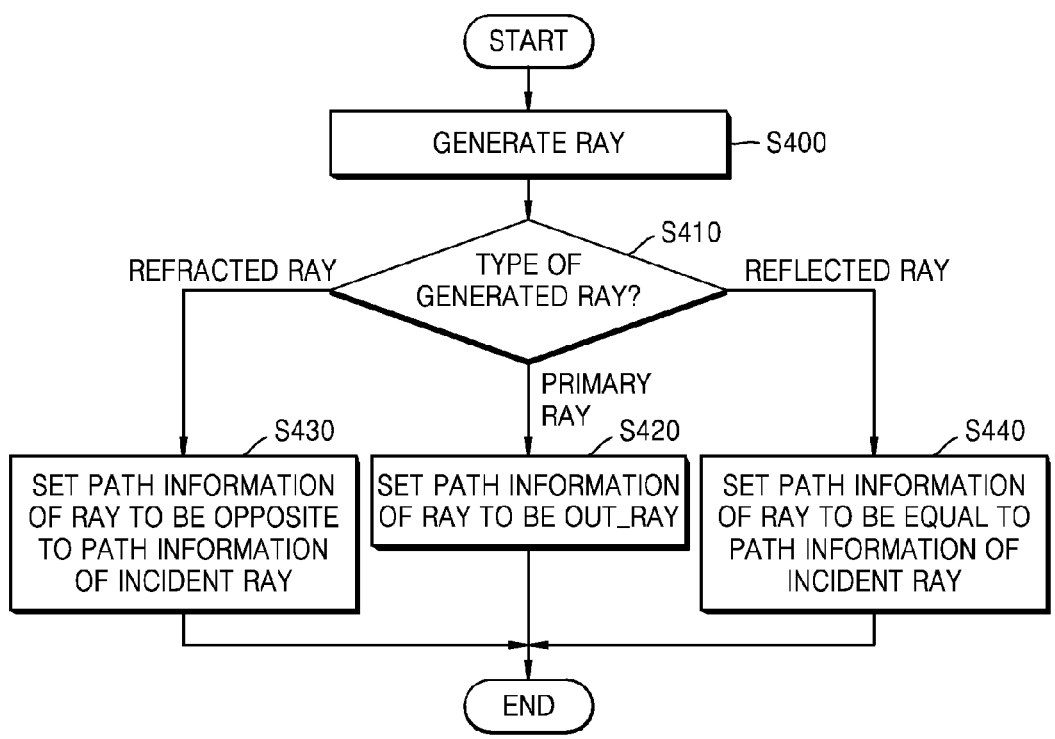
FIG. 4 illustrates an example of setting path information of a ray.

FIG. 4 illustrates an example of setting path information of a ray. Referring to FIG. 4, in operation S400, a ray is generated. In this example, IN_RAY is path information of a ray that passes through an inside of the object and OUT_RAY is path information of a ray that passes through an outside of the object. In operation S410, it is checked if a type of the generated ray is a primary ray, a refracted ray, or a reflected ray.

If a type of the ray is determined to be a primary ray in operation S410, the ray passes through the outside of the object. Thus, in operation S420, path information of the ray is set to be OUT_RAY.

If a type of the ray is determined to be a refracted ray in operation S410, the ray passes through a surface of the object. Thus, in operation S430, path information of the ray is set to be opposite to path information of an incident ray. For example, if the ray is a refracted ray, the ray passes through a surface of the object. Accordingly, if path information of an incident ray is OUT_RAY, path information of a generated refracted ray is set to be IN_RAY.

If a type of the ray is determined to be a reflected ray in operation S410, path information of the ray is set to be equal to the path information of the incident ray in operation S440. Additionally, if a type of the ray is a shadow ray, path information of the ray may be set to be equal to the path information of the incident ray. However, even when a type of the ray is a shadow ray, path information of the ray may be set to be different from the path information of the incident ray according to the location of a light source.

Referring to FIG. 4, a type of the generated ray may be determined according to an order with regard to types of rays in a sequential way, such that whether the generated ray is a primary ray is determined first, and if the generated ray is not a primary ray, whether the generated ray is a refracted ray is determined, and then, if the generated ray is not a refracted ray, whether the generated ray is a reflected ray is determined. In this example, since a type of the generated ray may not be determined according to an order with regard to types of ray such as a primary ray, a refracted ray, or a reflected ray, the determining of a type of the generated ray is not limited thereto.

Figure 5A:
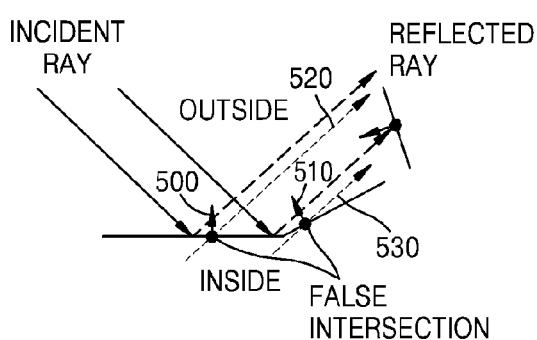
FIGS. 5A and 5B illustrate examples of a method of detecting an intersection error that occurs in the states of FIGS. 2A and 2B.
Figure 5B:
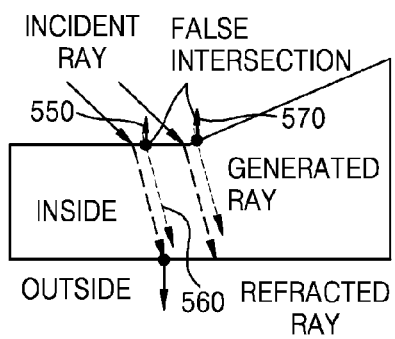

FIGS. 5A and 5B illustrate examples of a method of detecting an intersection error that occurs in the states of FIGS. 2A and 2B. If an intersection occurs at an inner surface of an object when a ray is passing through the outside of the object, or if an intersection occurs at an outer surface of an object when a ray is passing through the inside of the object, it is determined that an intersection error has occurred. If inner product values of rays 520, 530, and 560 and normal vectors 500, 510, and 550 of a primitive obtained by performing a calculation in a ray tracing process is a positive value, it is determined that an intersection has occurred at an inner surface of an object. If the inner product value thereof is a negative value, it is determined that an intersection has occurred at an outer surface of an object.

Figure 6:
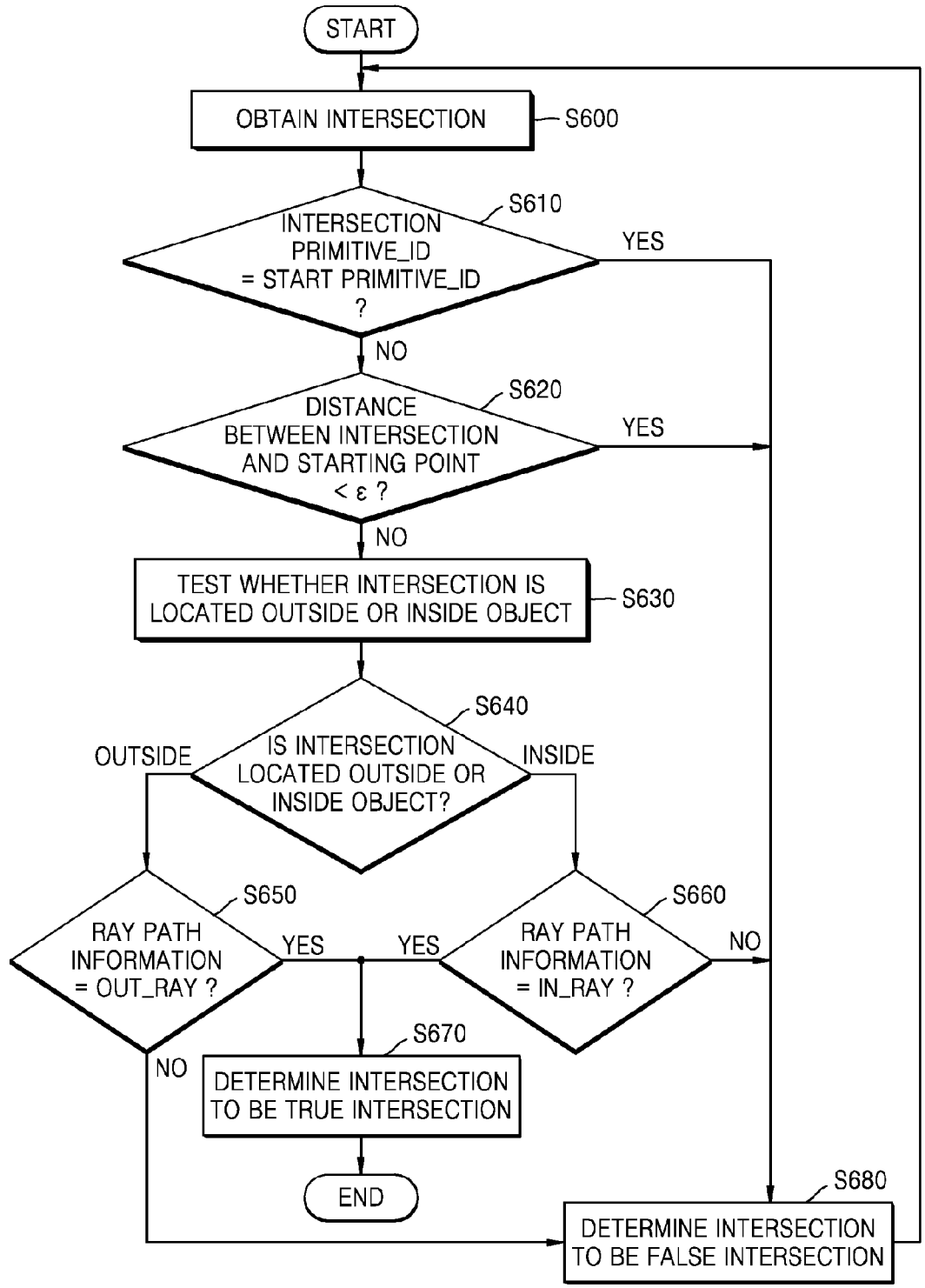
FIG. 6 illustrates a detailed example of a method of removing a intersection test error in ray tracing.

FIG. 6 illustrates a detailed example of a method of removing an intersection test error in ray tracing. Referring to FIG. 6, in operation S600, an intersection is obtained by performing an intersection test on a ray and a primitive. Then, a test is performed to find out if an intersection is properly obtained.

In operation S610, identification information of a primitive to which a starting point of a ray belongs (Start Primitive_id) and identification information of a primitive to which an intersection belongs (Intersection Primitive_id) are compared to each other. As a result of the comparing, if the identification information of the primitive to which the starting point of the ray belongs (Start Primitive_id) and the identification information of the primitive to which the intersection belongs (Intersection Primitive_id) are equal to each other, the intersection is determined to be a false intersection in operation S680.

In operation S620, if the identification information of the primitive to which the starting point of the ray belongs (Start Primitive_id) and the identification information of the primitive to which the intersection belongs (Intersection Primitive_id) are different from each other, a distance between the starting point of the ray and the intersection is obtained and then compared to a value $\epsilon$.

As a result of the comparing, if the distance therebetween is less than the value $\epsilon$, it is determined that the intersection is a false intersection in operation S680. If the distance therebetween is equal to or greater than the value $\epsilon$, whether the intersection is located inside or outside an object is determined in operation S640.

The test described with respect to operation S610 and the test described with respect to operation S620 may be performed before the intersection error test using a path of a ray, thereby reducing error test operations. Operation S610 and operation S620 may not be performed.

With regard to the intersection error test using a path of ray, an inner product of a normal vector and a ray that intersect with each other is obtained to determine whether the intersection is located inside or outside an object in operation S630. If the inner product is a negative value, it is determined that the intersection is located outside the object. If the inner product is a positive value, it is determined that the intersection is located inside the object. Referring to FIG. 5, if the inner product value of the rays 520, 530, and 560 and the normal vectors 500, 510, and 550 of the primitive that is obtained by performing a calculation in a ray tracing process is a positive value, it is determined that an intersection has occurred at an inner surface of an object. If the inner product value thereof is a negative value, it is determined that an intersection has occurred at an outer surface of an object.

Identification information of the intersection and path information of the ray are compared to each other. If the identification information of the intersection and the path information of the ray are equal to each other, it is determined that a true intersection is obtained, and a calculated intersection is returned. If the identification information of the intersection and the path information of the ray are different from each other, it is determined that a false intersection is obtained. If it is determined that a false intersection is obtained, another intersection is obtained.

In detail, if an intersection is determined to be outside an object in operation S640, whether path information of a ray is OUT_RAY is checked in operation S650. If path information of a ray is OUT_RAY, since the intersection is located outside an object, the intersection is determined to be a true intersection in operation S670. If the path information of a ray is not OUT_RAY, since the intersection is located outside an object, the intersection is determined to be a false intersection in operation S680, and another intersection is obtained in operation S600.

If an intersection is determined to be inside an object in operation S640, whether path information of the ray is IN_RAY is checked in operation S660. If path information of the ray is IN_RAY, since the intersection is located inside the object, the intersection is determined to be a true intersection in operation S670. If path information of the ray is not IN_RAY, since the intersection is located inside the object, the intersection is determined to be a false intersection in operation S680, and another intersection is obtained in operation S600.

In one example, an apparatus for removing an intersection test error in ray tracing one or more memories that store a program for performing a method of removing an intersection test error in ray tracing, and processors that execute the program.

Figure 7:
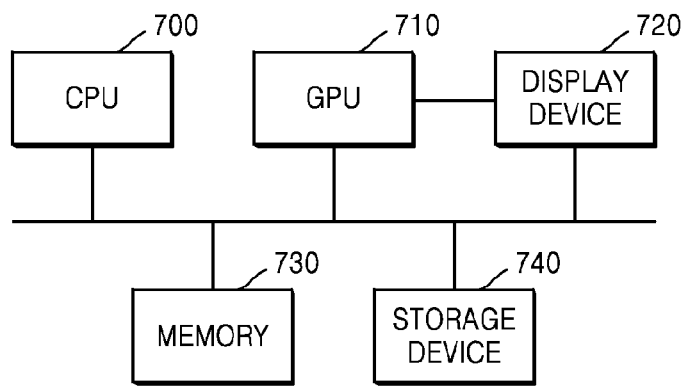
FIG. 7 illustrates an example of a system processors, a memory, and a storage device for performing a method of removing an intersection test error in ray tracing.

FIG. 7 illustrates an example of a system including processors 700 (a CPU) and 710 (a GPU), a memory 730, and a storage device 740 for performing a method of removing an intersection test error in ray tracing. The system further includes a display device 720 for displaying a result obtained by the processors 700 and 710 executing a program for performing the method of removing an intersection test error in ray tracing.

The processors 700 and 710 obtain an intersection by performing an intersection test on a ray and a primitive, and determine if the intersection is a false intersection. The memory 730 and the storage device 740 store the program and path information of a ray.

Assuming that IN_RAY is path information of a ray that passes through the inside of an object and OUT_RAY is path information of a ray that passes through an outside of an object, the processors 700 and 710 execute the program to set path information of a ray that is a primary ray to be OUT_RAY, path information of a ray that is a refracted ray to be opposite to path information of an incident ray, and path information of a ray that is a reflected ray to be equal to path information of an incident ray, generate location information of the intersection by determining if the intersection is located inside or outside the object, and compare the location information of the intersection to the path information of the ray. If the location information of the intersection is not equal to the path information of the ray, the processors 700 and 710 determine the intersection to be a false intersection.

Additionally, the processors 700 and 710 obtain an inner product value of the rays 520, 530, and 560 and the normal vectors 500, 510, and 550 of the primitive that intersects with the ray 520, 530, and 560 in FIGS. 5A and 5B. If the inner product value is a negative value, location information of the intersection is generated as being outside the object. If the inner product value is a positive value, location information of the intersection is generated as being inside the object.

Additionally, if an intersection is generated at an inner surface of an object when the path information of a ray is OUT_RAY, or if an intersection is generated at an outer surface of an object when the path information of a ray is IN_RAY, the processors 700 and 710 determine an intersection error, and obtain another intersection.

The processors 700 and 710 compare identification information of a primitive to which a starting point of a ray belongs (Start Primitive_id) to identification information of a primitive to which an intersection belongs (Intersection Primitive_id). If the identification information of the primitive to which the starting point of the ray belongs to (Start Primitive_id) and the identification information of the primitive to which the intersection belongs (Intersection Primitive_id) are different from each other, a distance between the starting point of the ray and the intersection is obtained, and compared to a value $\epsilon$. If the distance therebetween is less than the value $\epsilon$, the intersection is determined to be a false intersection. Additionally, if the identification information of the primitive to which the starting point of the ray belongs (Start Primitive_id) and the identification information of the primitive to which the intersection belongs (Intersection Primitive_id) are different from each other, the intersection may be determined to be a false intersection without having to compare the distance between the starting point of the ray and the intersection to the value $\epsilon$.

If the identification information of the primitive to which the starting point of the ray belongs (Start Primitive_id) and the identification information of the primitive to which the intersection belongs (Intersection Primitive_id) are equal to each other, the processors 700 and 710 determine that the intersection to be a false intersection.

Additionally, the processors 700 and 710 may communicate with the memories 730 and 740 and the display apparatus 720 via a bus.

In one example, a method of removing an intersection test error in ray tracing may be implemented as a hardware apparatus.

Figure 8:
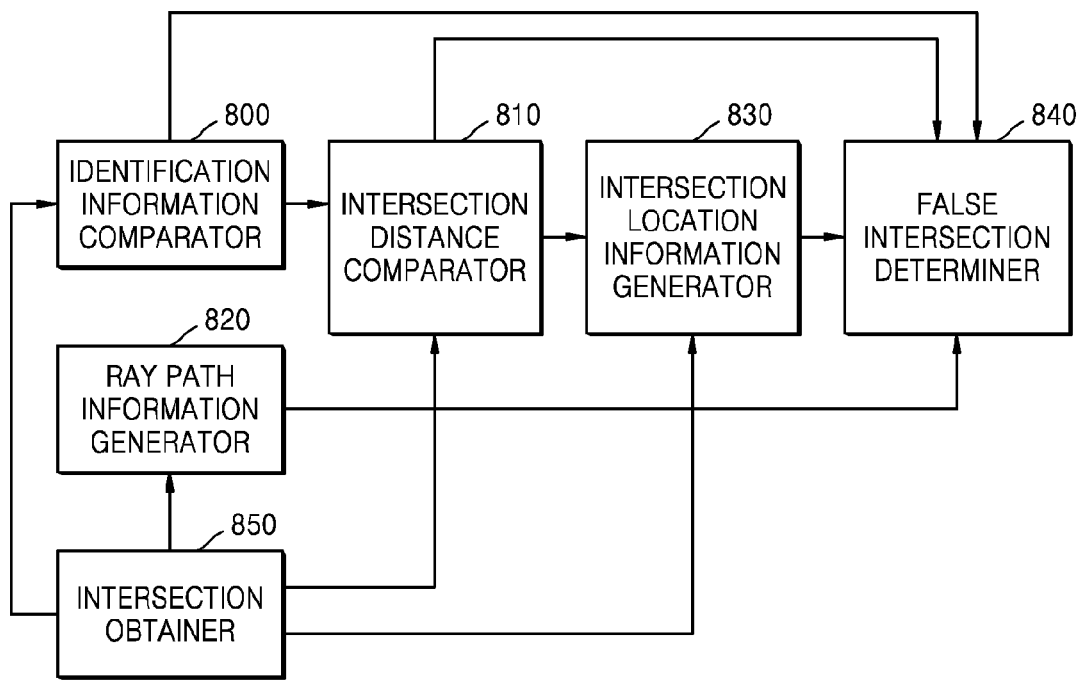
FIG. 8 illustrates an example of a configuration of an apparatus for removing an intersection test error in ray tracing.

FIG. 8 illustrates an example of a configuration of an apparatus for removing an intersection test error in ray tracing. The example of the apparatus for removing an intersection test error in ray tracing includes an identification information comparator 800, an intersection distance comparator 810, a ray path information generator 820, an intersection location information generator 830, a false intersection determiner 840, and an intersection obtainer 850.

The intersection obtainer 850 obtains an intersection by performing an intersection test on a ray and a primitive.

The intersection location information generator 830 determines if the intersection is located inside or outside an object. The intersection location information generator 830 obtains an inner product value of a ray and a normal vector of the primitive to determine whether the intersection is located inside or outside of an object. Then, if the inner product value is a negative value, it is determined that the intersection is located outside the object. If the inner product value is a positive value, it is determined that the intersection is located inside the object.

The false intersection determiner 840 compares location information of an intersection to path information of a ray. If the location information of the intersection is not equal to the path information of the ray, the false intersection determiner 840 determines the intersection to be a false intersection. It is assumed that IN_RAY is path information of a ray that passes through an inside of the object and OUT_RAY is path information of a ray that passes through an outside of the object. If an intersection is generated at an inner surface of an object when path information of a ray is OUT_RAY, or if an intersection is generated at an outer surface of an object when path information of a ray is IN_RAY, the false intersection determiner 840 determines that an intersection error has occurred.

The ray path information generator 820 sets path information of a ray to be OUT_RAY if the ray is a primary ray, sets path information of a ray to be opposite to path information of an incident ray if the ray is a refracted ray, and sets path information of a ray to be equal to path information of an incident ray if the ray is a reflected ray. Then, the ray path information generator 820 compares identification information of a primitive to which a starting point of a ray belongs to identification information of a primitive to which an intersection belongs.

The identification information comparator 800 compares identification information of a primitive to which a starting point of a ray belongs to identification information of a primitive to which the intersection belongs.

If identification information of a primitive to which a starting point of a ray belongs is equal to identification information of a primitive to which the intersection belongs, the intersection distance comparator 810 determines the intersection to be a false intersection. If identification information of a primitive to which a starting point of a ray belongs is different from identification information of a primitive to which the intersection belongs, the intersection distance comparator 810 obtains a distance between the starting point of the ray and the intersection, and compares the distance to a value $\epsilon$.

If the distance is less than the value $\epsilon$, the false intersection determiner 840 determines the intersection to be a false intersection. Additionally, the false intersection determiner 840 compares location information of the intersection to path information of a ray. If the location information of the intersection is not equal to the path information of the ray, the false intersection determiner 840 determines the intersection to be a false intersection.

As described above, according to the examples described above, generation of a hole in a rendered image may be prevented by removing an intersection error that may occur due to a floating point error with regard to a ray and object intersection test in a ray tracing system.

A program including instructions for controlling a computer to perform any method of removing an intersection test error in ray tracing described above may be stored on a non-transitory computer-readable storage medium. The non-transitory computer-readable storage medium may be read by the computer.

The program may include instructions for obtaining an intersection by performing an intersection test on a ray and a primitive, instructions for determining location information of the intersection indicating whether the intersection is generated inside or outside an object, and instructions for determining an intersection error based on comparing the location information of the intersection to path information of the ray.

Additionally, the instructions for determining whether the intersection is located inside or outside an object may include instructions for obtaining an inner product value of a ray and a normal vector of a primitive that intersects with the ray, and instructions for determining that the intersection is located outside the object if the inner product value is a negative value, and that the intersection is located inside the object if the inner product value is a positive value.

The identification information comparator 800, the intersection distance comparator 810, the ray path information generator 820, the intersection location information generator 830, the false intersection determiner 840, and the intersection obtainer 850 in FIG. 8 that perform the various operations described with respect to FIGS. 1 through 7 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

The examples described herein are to be considered in a descriptive sense only, and not for purposes of limitation. Descriptions of features or aspects within each example are to be considered as being applicable to other similar features or aspects in other examples.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of removing an intersection test error in ray tracing, the method comprising:
    obtaining an intersection by performing an intersection test on a ray and a primitive;
    determining location information of the intersection indicating whether the intersection is located inside or outside an object; and
    determining that an intersection error has occurred in response to the location information indicating that the intersection is located at an inner surface of the object and the path information of the ray being OUT_RAY, or in response to the location information indicating that the intersection is located at an outer surface of the object and the path information of the ray being IN_RAY,
    wherein the IN_RAY is path information of a ray passing through the inside of the object, and the OUT_RAY is path information of a ray passing through the outside of the object.

2. The method of claim 1, wherein the determining of the location information comprises:
    obtaining an inner product value of the ray and a normal vector of the primitive;
    determining that the intersection is located outside the object in response to the inner product value being a negative value; and
    determining that the intersection is located inside the object in response to the inner product value being a positive value.

3. The method of claim 1, further comprising setting the path information of the ray to be OUT_RAY in response to the ray being a primary ray;
    wherein IN_RAY is path information of a ray passing through an inside of the object, and OUT_RAY is path information of a ray passing through an outside of the object.

4. The method of claim 1, further comprising setting the path information of the ray to be opposite to path information of an incident ray in response to the ray being a refracted ray;
    wherein IN_RAY is path information of a ray passing through an inside of the object, and OUT_RAY is path information of a ray passing through an outside of the object.

5. The method of claim 1, further comprising setting the path information of the ray to be equal to path information of an incident in response to the ray being a reflected ray;
    wherein IN_RAY is path information of a ray passing through an inside of the object, and OUT_RAY is path information of a ray that passing through an outside of the object.

6. The method of claim 1, wherein the determining of the intersection error comprises:
    comparing identification information to which a starting point of the ray belongs to identification information of a primitive to which the intersection belongs; and
    determining an intersection error in response to the identification information to which the starting point of the ray belongs and the identification information of the primitive to which the intersection belongs being equal to each other.

7. The method of claim 1, wherein the determining of the intersection error comprises:
    obtaining a distance between a starting point of the ray and the intersection;
    comparing the distance to a value $\epsilon$; and
    determining an intersection error in response to the distance being less than the value $\epsilon$.

8. An apparatus for removing an intersection test error in ray tracing, the apparatus comprising:
    a processor configured to obtain an intersection by performing an intersection test on a ray and a primitive, and obtain location information of the intersection indicating whether the intersection is located inside or outside an object; and
    a memory configured to store path information of the ray;
    wherein the response is further configured to determine that an intersection error has occurred in response to the location information indicating that the intersection is located at an inner surface of the object and the path information of the ray being OUT_RAY, or in response to the location information indicating that the intersection is located at an outer surface of the object and the path information of the ray being IN_RAY, and
    wherein the IN_RAY is path information of a ray passing through an inside of the object, and the OUT_RAY is path information of a ray passing through an outside of the object.

9. The apparatus of claim 8, wherein the processor is further configured to obtain an inner product value of the ray and a normal vector of the primitive, determine that the intersection is located outside the object in response to the inner product value being a negative value, and determine that the intersection is located inside the object in response to the inner product value being a positive value.

10. The apparatus of claim 8, wherein the processor is further configured to set the path information of the ray to be OUT_RAY in response to the ray being a primary ray; and
    IN_RAY is path information of a ray that passing an inside of the object, and OUT_RAY is path information of a ray passing through an outside of the object.

11. The apparatus of claim 8, wherein the processor is further configured to set the path information of the ray to be opposite to path information of an incident in response to the ray being a refracted ray; and
    IN_RAY is path information of a ray passing through an inside of the object, and OUT_RAY is path information of a ray passing through an outside of the object.

12. The apparatus of claim 8, wherein the processor is further configured to set the path information of the ray to be equal to path information of an incident in response to the ray being a reflected ray; and
    IN_RAY is path information of a ray passing through an inside of the object, and OUT_RAY is path information of a ray passing through an outside of the object.

13. The apparatus of claim 8, wherein the processor is further configured to compare identification information of a primitive to which a starting point of the ray belongs to identification information of a primitive to which the intersection belongs, and determine an intersection error in response to the identification information to which the starting point of the ray belongs and the identification information of the primitive to which the intersection belongs being equal to each other.

14. The apparatus of claim 8, wherein the processor is further configured to obtain a distance between the starting point of the ray and the intersection, compare the distance to a value ϵ, determine an intersection error in response to the distance being less than the value ϵ.

15. An apparatus for removing an intersection test error in ray tracing, the apparatus comprising:
an intersection obtainer configured to obtain an intersection by performing an intersection test on a ray and a primitive;
an intersection location information generator configured to determine whether the intersection is located inside or outside an object; and
a false intersection determiner configured to determine that an intersection error has occurred in response to the location information indicating that the intersection is located inside the object and the path information of the ray being OUT_RAY, or in response to the location information indicating that the intersection is located outside the object and the path information of the ray being IN_RAY,
wherein the IN_RAY is path information of a ray passing through an inside of the object, and the OUT_RAY is path information of a ray passing through an outside of the object.

16. The apparatus of claim 15, wherein the intersection location information generator is further configured to:
obtain an inner product value of the ray and a normal vector of the primitive intersecting the ray;
determine that the intersection is located outside the object in response to the inner product value being a negative value; and
determine that intersection is located inside the object in response to the inner product value being a positive value.

17. The apparatus of claim 15, further comprising a ray path information generator configured to set the path information of the ray to be OUT_RAY in response to the ray being a primary ray, set the path information of the ray to be OUT_RAY in response to the ray being a primary ray, and set the path information of the ray to be opposite to path information of an incident ray in response to the ray being a refracted ray;
wherein IN_RAY is path information of a ray passing through an inside of the object, and OUT_RAY is path information of a ray passing through an outside of the object.

18. The apparatus of claim 15, further comprising:
an identification information comparer configured to compare identification information of a primitive to which a starting point of the ray belongs to identification information of a primitive to which the intersection belongs;
an intersection distance comparer configured to obtain a distance between the starting point of the ray and the intersection, and compare the distance to a value ϵ in response to the identification information to which the starting point of the ray belongs and the identification information of the primitive to which the intersection belongs being different from each other; and
a false intersection determiner configured to determine an intersection error in response to the distance being less than the value ϵ;
wherein the false intersection determination unit is further configured to compare the location information of the intersection to the path information of ray, and determine the intersection to be a false intersection in response to the location information of the intersection not being equal to the path information of the ray.

19. The apparatus of claim 18, wherein the false intersection determiner is further configured to determine the intersection to be a false intersection in response to the identification information of the primitive to which the starting point of the ray belongs and the identification information of the primitive to which the intersection belongs being equal to each other.

20. A non-transitory computer-readable storage medium storing a computer program for controlling a computer to perform a method of removing an intersection test error in ray tracing, the method comprising:
obtaining an intersection by performing an intersection test on a ray and a primitive;
determining whether the intersection is located inside or outside an object; and
determining that an intersection error has occurred in response to the location information indicating that the intersection is located at an inner surface of the object and the path information of the ray being OUT_RAY, or in response to the location information indicating that the intersection is located at an outer surface of the object and the path information of the ray being IN_RAY,
wherein the IN_RAY is path information of a ray passing through the inside of the object, and the OUT_RAY is path information of a ray passing through the outside of the object.

21. The non-transitory computer-readable storage medium of claim 20, wherein the determining of whether the intersection is located inside or outside the object comprises:
obtaining an inner product value of the ray and a normal vector of a primitive intersecting the ray;
determining that the intersection is located outside the object in response to the inner product value being a negative value; and
determining that the intersection is located inside the object in response to the inner product value being a positive value.

* * * * *